United States Patent [19]

Kraft

[11] 4,056,014
[45] Nov. 1, 1977

[54] SINTERED PULLEY HUB CONSTRUCTION AND METHOD OF MAKING SAME

[75] Inventor: Derald H. Kraft, Canton, Ohio
[73] Assignee: Aspro, Inc., Canton, Ohio
[21] Appl. No.: 680,427
[22] Filed: Apr. 26, 1976
[51] Int. Cl.² .................... F16H 55/36; F16H 55/44
[52] U.S. Cl. .................... 74/230.4; 74/230.8; 29/159 R
[58] Field of Search ............... 74/230.3, 230.4, 230.8; 29/159 R

[56] References Cited

U.S. PATENT DOCUMENTS

| | | | |
|---|---|---|---|
| 2,955,748 | 10/1960 | Killian | 74/230.8 |
| 3,273,411 | 9/1966 | Schultz, Jr. | 74/230.4 |
| 3,722,310 | 3/1973 | Schultz, Jr. | 74/230.8 |

Primary Examiner—Samuel Scott
Assistant Examiner—Allan R. Burke
Attorney, Agent, or Firm—Frease & Bishop

[57] ABSTRACT

A sintered pulley hub construction for mounting on a bottom wall of a sheet metal pulley cup. A pair of tubular members is pressure formed in a green compact state from a metal powder mixture. One of the members has a cylindrical body which terminates at one end in an outwardly extending annular flange which forms a hub pulling flange. The other member has an interior annular cavity formed in one end and a radially outwardly extending annular flange formed on the other end. The cylindrical body of the one member is telescopically received within the annular cavity of the other member. The members are joined by sintering to form an integral homogeneous body. The outer surface of the other member has a cylindrical portion extending axially between the radial end flange and an annular shoulder for receiving an axially extending flange of a pulley cup, with the shoulder providing a zone for welding the pulley cup to the hub. The method of forming the improved hub includes the steps of separately pressure-forming each of the tubular members in a green compact state in a pair of molds. Then a cylindrical end portion formed on one of the tubular members is telescopically mounted within an annular interior cavity formed in one end of the other tubular member. The joined members then are sintered in a furnace and the green compacted members cohere to each other and form an integral homogeneous member.

13 Claims, 7 Drawing Figures

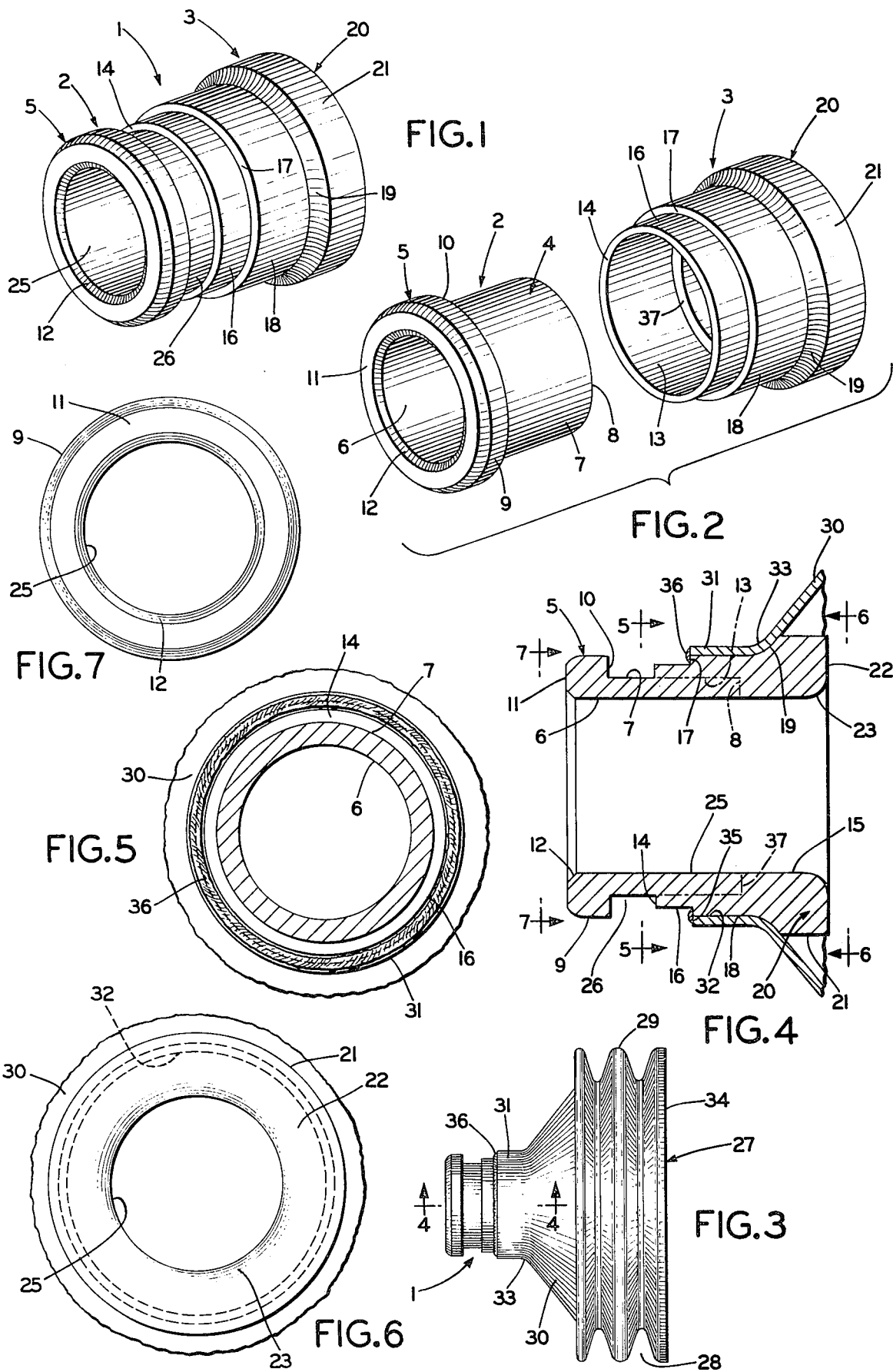

SINTERED PULLEY HUB CONSTRUCTION AND METHOD OF MAKING SAME

BACKGROUND OF THE INVENTION

1. Field of the Invention

The invention relates to a pulley hub for mounting on a bottom wall of a sheet metal pulley. More particularly, the invention relates to a pulley hub consisting of a pair of tubular members formed of a powder metal mixture which are telescopically joined in a green compact state and then sintered to form an integral homogeneous member which eliminates costly machining operations to provide a hub pulling flange thereon. The invention further relates to an improved method of forming such a sintered pulley hub by pressure and heating steps carried out with a powder metal mixture.

2. Description of the Prior Art

Most pulley hubs are formed from tubular steel stock which is cut to predetermined axial lengths, with the various flanges and grooves being machined or milled therein. These hub constructions are satisfactory for their intended applications, but the machining procedures increase considerably the costs of the hubs. Likewise, removal of metal by machining results in metal waste.

Machining generally is required to form a groove in the hub body which provides a radial annular flange on one end of the hub for gripping by a hub puller for removing the hub and connected pulley from a shaft should replacement be required. Such machining also is required to form flanges and other areas for receiving a sheet metal pulley which is secured thereon by welding, brazing or the like.

Recent years have seen advancements in powder metallurgy and the subsequent production of various hubs from powdered metal by pressing and sintering predetermined quantities and mixtures of such powder metal. Examples of various articles formed from metal powder and methods of producing such articles are illustrated in U.S. Pat. Nos. 2,561,583, 3,260,596, 3,391,444, 3,719,497 and 3,720,512.

Problems, however, have been encountered in attempting to form pulley hubs having pulling flanges formed thereon by powder metallurgy. It is difficult to form an annular groove in the hub body which forms a pulling flange due to the difficulty of press forming such an exterior annular groove in the greenpressed hub compacts prior to sintering by known press molding equipment.

No known pulley hub construction and method of making the same of which I am aware eliminates these difficulties by providing a pulley hub structure and method of forming such a pulley hub having an annular pulling flange thereon, by pressure forming a pair of tubular members in green compact form which, when they are joined and subsequently sintered form an integral homogeneous hub with an annular pulling groove and flange.

SUMMARY OF THE INVENTION

Objectives of the invention include providing a sintered pulley hub construction from a pair of tubular members, each of which is pressure-formed from an unheated powder metal mixture, which members then are telescopically joined and sintered in a furnace to form an integral homogeneous pulley hub; providing such a pulley hub which has a radially outwardly extending annular flange formed on one end thereof which provides a hub pulling flange easily gripped by pulling equipment for removing the hub from a shaft for replacement and maintenance problems; providing such a hub having a radially outwardly extending annular shoulder which is adapted to radially align or be in close proximity with an edge of a sheet metal pulley cup which is mounted on the hub to provide an annular area for securing the pulley cup to the hub by welding, brazing or the like; providing such a hub construction having an annular outer surface extending axially from the annular shoulder away from the pulling flange and terminating in a second outwardly extending radial end flange which forms a seat for receiving an annular mounting flange of a pulley cup, which mounting flange defines the hub receiving opening in the cup bottom wall; providing such a pulley hub in which the pair of tubular members may be pressure-formed into a cold green compact state and then joined in such a cold state, and then subsequently sintered to form the integral hub; and providing such a hub construction which may be produced inexpensively by eliminating expensive machining and material waste, which may be produced simply, conveniently, efficiently and with a variety of physical characteristics by varying the ingredients of the powder metal mixture, compacting pressure and sintering temperature thereof, and which pulley hub construction eliminates difficulties existing in the art.

Further objectives of the invention include providing a new method and procedure for making such a sintered pulley hub from a powder metal mixture in which the pair of tubular hub components are pressure formed in molds into green compacts of powder metal, which members are subsequently assembled and sintered to form a pulley hub having an annular pulling flange, a sheet metal pulley cup seating area, and an annular zone for welding the sheet metal cup to the hub.

These objectives and advantages are obtained by the sintered pulley hub construction, the general nature of which may be stated as including first and second tubular members pressure-formed of a powder metal mixture; the first tubular member having a main cylindrical body terminating at one end in a radially outwardly extending annular flange; the second tubular member having an interior annular cavity formed in one end thereof and a radially outwardly extending annular flange formed on the other end thereof; the outer surface of the cylindrical body of the first tubular member having a diameter equal to the diameter of the interior annular cavity of the second tubular member; and the cylindrical body portion of the first tubular member being telescopically received within the annular cavity of the second tubular member and secured therein by sintering, with the annular flange of the first tubular member forming a hub pulling flange and the annular flange of the second tubular member forming a seat for mounting a pulley cup thereon.

These objectives and advantages are obtained further by the improved method of making a pulley hub, the general nature of which may be stated as including the steps of press forming a metal powder mixture in a mold to form a first tubular member having a cylindrical main body and a radially outwardly extending annular flange on one end thereof; press forming a metal powder mixture in a second mold to form a second tubular member having an interior annular cavity formed in one end thereof and a radially outwardly extending annular flange formed on the other end thereof; telescopically inserting at least a portion of the cylindrical body of the first tubular member into the annular cavity of the second tubular member; and sintering the joined first and second tubular members to form a composite sintered powder metal pulley hub.

BRIEF DESCRIPTION OF THE DRAWING

The preferred embodiment of the improved hub construction and method steps for the manufacture thereof — illustrative of the best mode in which applicant has contemplated applying the principles — are set forth in the following description and shown in the accompanying drawing, and are particularly and distinctly pointed out and set forth in the appended claims.

FIG. 1 is an enlarged perspective view of the sintered pulley hub construction produced by the steps of the improved procedure;

FIG. 2 is an exploded perspective view of the pair of green compact tubular members which are pressure formed of powder metal by the steps of the improved procedure prior to telescopic engagement and sintering of the members to form the hub construction of FIG. 1;

FIG. 3 is an elevational view of the improved pulley hub construction of FIG. 1 mounted on a sheet metal pulley cup having a plurality of V-grooves formed therein;

FIG. 4 is an enlarged fragmentary sectional view taken on line 4—4, FIG. 3;

FIG. 5 is a fragmentary sectional view taken on line 5—5, FIG. 4;

FIG. 6 is a fragmentary end elevational view looking in the direction of arrow 6—6, FIG. 4; and FIG. 7 is an end elevational view looking in the direction of arrow 7—7, FIG. 4.

Similar numerals refer to similar parts throughout the drawing.

DESCRIPTION OF THE PREFERRED EMBODIMENT AND METHOD STEPS OF THE INVENTION

The improved pulley hub construction produced by the steps of the improved method is shown in FIG. 1, and is indicated generally at 1. Hub construction 1 includes a pair of generally tubular-shaped members indicated generally at 2 and 3, and which are shown in an unassembled state in FIG. 2. Members 2 and 3 are pressure-formed from a predetermined unheated powder metal mixture into a green compact state prior to being joined to form the improved hub construction 1 of FIG. 1.

Tubular member 2 includes a main cylindrical body 4 which terminates at one end in a outwardly extending annular flange 5. Body 4 has a smooth cylindrical internal bore 6 (FIG. 4) and a smooth outer cylindrical surface 7. The end of cylindrical body 4 opposite flange 5, terminates in an annular edge 8. Annular flange 5 has an annular axially extending outer surface 9 which is joined with surface 7 by a radially extending annular surface 10. Flange 5 further includes a flat annular end face 11 which terminates in a conical inwardly extending surface 12 which joins internal bore 6.

Tubular member 3 (FIGS. 2 and 4) includes an interior annular cavity 13 which extends axially from annular end surface 14 of member 3. The remaining interior portion of member 3 has a smooth internal cylindrical bore 15 equal in diameter to internal bore 6 of member 2, as shown in FIG. 4.

An exterior annular recess 16 is formed in the end of member 3 adjacent interior cavity 13 and forms an annular radially extending shoulder 17 which extends between and joins recess 16 and a cylindrical outer axially extending surface 18 of member 3. Surface 18 terminates in an upwardly outwardly extending flange 19 which is concavely-shaped in cross-section. Flange 19 terminates in and forms a radially outwardly extending annular flange 20 on the other end of member 3.

Flange 20 includes a cylindrical axially extending outer surface 21 and an annular radially extending end face 22. End face 22 is joined with internal bore 15 of member 3 by a curved corner 23 which is convexly-shaped in cross-section (FIG. 4). The thickness of cylindrical body 4 between inner and outer surfaces 6 and 7, respectively, is equal to the depth of internal cavity 13 of member 3. This configuration enables bore 6 of member 2 to form a continuous hub bore 25 with internal bore 15 of member 3 when member 2 is telescopically engaged within member 3.

In accordance with the invention, flange surface 10 of member 2 forms an annular groove 26 with end surface 14 of member 3 when the members are joined (FIG. 4), into which a hub pulling device can project to grip flange 5 for removing hub 1 from a shaft for replacement, should the pulley become damaged or worn. The diameter of annular surface 9 of flange 5 preferably is equal to the diameter of cylindrical outer surface 18 of member 3, whereby surfaces 9 and 18 lie in a common imaginary cylinder for reasons set forth below.

Improved hub construction 1 is shown in FIG. 3 mounted on a sheet metal pulley cup 27 which has a plurality of V-grooves 28 roller spun in an axially extending side wall 29 which is integral with a conical wall 30. Wall 30 terminates in an annular axially extending flange 31 which defines a central opening 32 for receiving pulley hub 1 therein. Axial flange 31 of pulley cup 27 joins conical wall 30 in a corner 33 (FIG. 4) which has the same general configuration as annular corner 19 of flange 20.

Hub 1 is mounted easily on pulley cup 27 by inserting hub 1 through the open outer cup end 34 of cup side wall 29 and through central opening 32 formed by attachment flange 31. Flange 5 passes through opening 32 due to the diameter of axial surface 9 of member 2 being equal to the diameter of cylindrical surface 18 of member 3, which in turn is generally equal to the diameter of cup opening 32. Attachment flange 31 aligns with and abuts cylindrical surface 18 of tubular member 3 with corner 33 of cup 27 conforming to the curvature of flange corner 19 as shown in FIG. 4, when cup 27 is mounted on hub 1.

One of the features of the invention is the alignment of annular edge 35 of attachment flange 31 with annular shoulder 17 of member 3 to provide a sufficiently wide radially extending annular surface for securing pulley cup 27 to hub 1 by welds 36 (FIGS. 4 and 5).

The improved method for forming pulley hub 1 includes the steps of forming members 2 and 3 from an unheated powder metal mixture having a predetermined composition depending upon the particular physical and mechanical properties desired for the final pulley hub. A quantity of the powder metal is placed in molds having configurations conforming to that of members 2 and 3. This powder metal then is compressed to form members 2 and 3 in a green-pressed compact state. The types of molds and presses for carrying out such press-forming steps may have various constructions and arrangements all of which are known in the art, and therefore are not described in detail or shown in the drawing. These molds preferably are unheated eliminating additional heating equipment and and expense at the molding site.

The green compact members 2 and 3, which have the configurations as shown in FIG. 2, then are telescopically joined as shown in FIG. 1, and placed in a sintering furnace. The joined members are heated at a predetermined temperature for a certain period of time until sintering occurs. The abutting surfaces of the joined members upon sintering, integrally join to form a single piece hub having a homogeneous sintered metal body. The temperature and application time, as well as the compacting pressure initially applied in forming members 2 and 3, are dependent upon the particular mixture of powder metal used in forming the pulley hub. One tye of powder metal mixture found suitable for hub 1 consists of iron and carbon in various percentages in accordance with Designations F-0008-S or F-0008-R of Standard No. 35 of the Metal Powder Industries Federation to form a sintered steel hub. If desired, the powder metal mixture may consist only of iron, carbon and small amounts of copper to form a sintered steel, copper impregnated hub.

The axial length of internal cavity 13 of member 3 preferably is shorter than the axial length of cylindrical surface 7 of member 2. This arrangement provides that upon telescopic engagement of members 2 and 3, edge 8 of cylindrical body 4 abuts the inner edge or shoulder 37 formed by cavity 13, whereby surface 10 of flange 5 is spaced from end surface 14 of member 3 and forms pulling groove 26 in assembled hub 1.

The diameters of internal bores 6 and 15 of members 2 and 3 may be varied by increasing the thickness of cylindrical body 4 and of member 3 to provide hubs 1 with internal bores 25 of various diameters for mounting on a variety of shafts without affecting the diameter of pulley cup mounting surface 18. Likewise, the diameter of bore 25 may remain constant with the diameter of surface 18 being increased by increasing the thickness of member 3 to accomodate pulley cups having various diameter hub wall openings 32.

Another advantage of the method and construction described above is the providing of a sufficiently large annular area formed by shoulder 17 and cup edge 35 for securing cup 27 on hub 1 by a simple circular welding procedure. Flange 22 of member 3 assists in strengthening the connection between cup 27 and hub 1 by trapping cup mounting flanges 31 between corner 19 and the welded connection controlling axial movement of the pulley cup with respect to the hub. Tubular members 2 and 3 need not be formed of the same powder metal mixture. It may be desirable for some hub applications to form tubular member 2 of a denser and stronger powder metal to increase the strength of the pulling flange 5. Likewise, tubular member 3 may be formed of another and different powder metal mixture than that of member 2 to provide better welding characteristics for securing pulley cup 27 on member 3.

Accordingly, the present invention provides substantial improvements in the art of making a pulley hub construction and the mounting of such a hub on an sheet metal pulley cup, which satisfies the various objectives set forth above, which solves problems and satisfies demands existing in the art, and which obtains the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved sintered pulley hub construction and procedure for forming such hub construction is carried out, the characteristics and the advantageous, new and useful results obtained, the new and useful constructions, method steps and procedures are set forth in the appended claims.

I claim:

1. A pulley hub construction including:
   a. first and second tubular members;
   b. the first tubular member having a main cylindrical body terminating at one end in a radially outwardly extending annular flange;
   c. the second tubular member having an interior annular cavity formed in one end thereof and a radially outwardly extending annular flange formed on the other end thereof;
   d. the outer surface of the cylindrical body of the first tubular member having a diameter generally equal to the diameter of the interior annular cavity of the second tubular member; and
   e. the cylindrical body portion of the first tubular member being telescopically received within the annular cavity of the second tubular member and secured therein with the annular flange of the first tubular member forming a hub pulling flange and the annular flange of the second tubular member forming a seat for mounting a pulley cup thereon.

2. The construction defined in claim 1 in which the second tubular member is formed with an annular recess in said one end and an outer annular surface extending axially between the annular recess and the annular flange; and in which the junction of said recess and annular surface forms a shoulder which provides a weld zone for securing a pulley cup on the hub.

3. The construction defined in claim 2 in which the annular flange of the second tubular member is joined with the outer annular surface by an annular corner concavely-curved in cross section.

4. The construction defined in claim 2 in which the diameter of the outer annular surface of the second tubular member is equal to the diameter of the radial flange of the first tubular member.

5. The construction defined in claim 1 in which the thickness of the cylindrical body of the first tubular member is equal to the depth of the interior cavity of the second tubular body; and in which the inner surfaces of the first and second tubular members form a cylindrical hub bore when joined for receiving a shaft therein.

6. The construction defined in claim 1 in which the axial length of the cylindrical body of the first tubular member is greater than the axial length of the annular cavity of the second tubular member; and in which the annular flange of the first tubular member is axially spaced from said one end of the second tubular member to form a pulling groove extending between said flange and said one end.

7. A pulley hub construction including:
a. first and second hollow tubular members;
b. the first tubular member having a main cylindrical body terminating at one end in a radially outwardly extending annular flange;
c. the second tubular member having an interior annular cavity and an exterior annular recess formed in one end of said tubular member, with said exterior annular recess forming an annular shoulder, said shoulder providing a zone for attaching a sheet metal pulley cup to the second tubular member;
d. the outer surface of the cylindrical body of the first tubular member having a diameter generally equal to the diameter of the interior annular cavity of the second tubular member; and
e. the cylindrical body portion of the first tubular member being telescopically received within the annular cavity of the second tubular member and secured therein, with the annular flange of the first tubular member being spaced from said one end of the second tubular member and forming a pulling groove therebetween.

8. The construction defined in claim 7 in which a radially outwardly extending annular flange is formed on the other end of the second tubular member; and in which a cylindrical outer surface extends between the annular flange and the attachment shoulder, with said annular flange and cylindrical surface forming a seat for receiving a pulley cup attachment flange thereon.

9. The construction defined in claim 7 in which the axial length of the cylindrical body of the first tubular member is greater than the axial length of the annular cavity of the second tubular member whereby the annular flange of said first member is spaced from said one end of the second member for forming the pulling groove therebetween.

10. A pulley construction including:
a. a sheet metal pulley cup having a bottom wall and a side wall extending in a generally axially direction from the bottom wall, with said bottom wall having a hub receiving opening formed therein;
b. hub means telescopically mounted within the bottom wall opening, said hub means having first and second tubular members;
c. the first tubular member having a cylindrical body terminating at one end in a radially outwardly extending annular hub pulling flange, with the second tubular member having a generally cylindrical body with an interior annular cavity formed in one end thereof;
d. the cylindrical body portion of the first tubular member being telescopically received within the annular cavity of the second tubular member and secured therein; and
e. means joining the pulley cup bottom wall to the second tubular member with the cup side wall extending away from the annular flange of the first tubular member.

11. The pulley construction defined in claim 10 in which the pulley cup bottom wall opening is defined by an annular axially extending flange; in which the second tubular member has a radially outwardly extending annular flange formed on the other end of the cylindrical body; and in which the cup bottom wall flange is seated on said cylindrical body and in abutment with said radial flange.

12. The pulley construction defined in claim 11 in which an exterior annular shoulder is formed on the second tubular member adjacent said one end; in which the cup bottom wall flange terminates in an annular outer edge; and in which said edge aligns generally radially with said shoulder of the second tubular member to form an annular zone for securing the pulley cup to the hub means.

13. The pulley construction defined in claim 11 in which the radius of the annular flange of the first tubular member is equal to the radius of the cylindrical surface of the second tubular member.

* * * * *